(12) United States Patent
Allen et al.

(10) Patent No.: US 10,719,425 B2
(45) Date of Patent: Jul. 21, 2020

(54) HAPPENS-BEFORE-BASED DYNAMIC CONCURRENCY ANALYSIS FOR ACTOR-BASED PROGRAMS

(71) Applicant: Oracle International Corporation, Redwood Shores, CA (US)

(72) Inventors: Nicholas John Allen, Westlake (AU); Yang Zhao, St. Lucia (AU); Cristina Nicole Cifuentes, Forest Lake (AU); Nathan Robert Albert Keynes, Kuraby (AU)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 16/007,983

(22) Filed: Jun. 13, 2018

(65) Prior Publication Data

US 2019/0384695 A1 Dec. 19, 2019

(51) Int. Cl.
*G06F 11/00* (2006.01)
*G06F 11/36* (2006.01)

(52) U.S. Cl.
CPC ........ *G06F 11/3636* (2013.01); *G06F 11/366* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,718,294 B1* | 4/2004 | Bortfeld | ............. | G06F 11/3632 703/20 |
| 9,430,353 B2* | 8/2016 | Shafi | ............. | G06F 11/323 |
| 9,885,448 B2* | 2/2018 | Burkes | ............. | F16L 58/1036 |
| 10,394,691 B1* | 8/2019 | Cole | ............. | G06F 11/3636 |
| 2003/0121027 A1* | 6/2003 | Hines | ............. | G06F 11/362 717/135 |
| 2008/0209436 A1* | 8/2008 | Agha | ............. | G06F 11/3632 718/106 |
| 2011/0099550 A1* | 4/2011 | Shafi | ............. | G06F 11/3058 718/102 |
| 2013/0332711 A1* | 12/2013 | Leidel | ............. | G06F 9/3009 712/227 |

OTHER PUBLICATIONS https://www.youtube.com/watch?v=7erJ1DV_Tlo&feature=emb_logo (Year: 2012).*

Mark Christiaens et al., "TRaDe, a topological approach to on-the-fly race detection in java programs", JVM'01 Proceedings of the 2001 Symposium on Java Virtual Machine Research and Technology Symposium—vol. 1, Apr. 23, 2001 (13 pages).

Stefan Savage et al., "Eraser: A Dynamic Data Race Detector for Multithreaded Programs", ACM Transactions on Computer Systems (TOCS), Nov. 1, 1997 (21 pages).

(Continued)

*Primary Examiner* — Amine Riad
(74) *Attorney, Agent, or Firm* — Ferguson Braswell Fraser Kubasta PC

(57) ABSTRACT

A method may include generating, for a concurrent application, an execution trace that includes operations, extracting actor pairs from the execution trace, assigning each of the operations to an actor pair, and generating vector clocks for the operations. Each vector clock may include a clock value for each of the actor pairs.

19 Claims, 6 Drawing Sheets

(56) References Cited

OTHER PUBLICATIONS

Robert O'Callahan et al., "Hybrid Dynamic Data Race Detection", PPoPP '03 Proceedings of the ninth ACM SIGPLAN symposium on Principles and practice of parallel programming, Jun. 11, 2003 (12 pages).
Konstantin Serebryany et al., "ThreadSanitizer—data race detection in practice", WBIA '09 Proceedings of the Workshop on Binary Instrumentation and Applications, Dec. 12, 2009 (10 pages).
Elvira Albert et al., "May-Happen-in-Parallel Analysis for Actor-based Concurrency", ACM Transactions on Computational Logic (TOCL), Mar. 28, 2016 (49 pages).
Elvira Albert et al., "Testing of Concurrent and Imperative Software using CLP", PPDP '16 Proceedings of the 18th International Symposium on Principles and Practice of Declarative Programming, Sep. 5, 2016 (8 pages).
Elvira Albert et al,, "Context-Sensitive Dynamic Partial Order Reduction", Computer Aided Verification, 29th International Conference, CAV 2017, Part 1, Jul. 24, 2017 (18 pages).
Cormac Flanagan et al., "FastTrack: Efficient and Precise Dynamic Race Detection", PLDI '09 Proceedings of the 30th ACM SIGPLAN Conference on Programming Language Design and Implementation, Jun. 15, 2009 (13 pages).
James Wilcox et al., "Array Shadow State Compression for Precise Dynamic Race Detection", 2015 30th IEEE/ACM International Conference on Automated Software Engineering (ASE), May 2015 (14 pages).
Dustin Rhodes et al., "BIGFOOT: Static Check Placement for Dynamic Race Detection", PLDI 2017 Proceedings of the 38th ACM SIGPLAN Conference on Programming Language Design and Implementation, Mar. 14, 2017 (34 pages).

\* cited by examiner

HAPPENS-BEFORE-BASED DYNAMIC CONCURRENCY ANALYSIS FOR ACTOR-BASED PROGRAMS

BACKGROUND

Data races are a common defect occurring in concurrent code. A data race occurs when multiple accesses to the same memory location occur concurrently, including at least one write, such that the contents of the memory location may be overwritten before it is read by another concurrent access. One technique used to detect concurrency problems is happens-before-based dynamic analysis, which analyzes concrete program executions and determines happens-before ordering relations between executed operations, and hence which operations may be executed concurrently.

However, conventional happens-before-based dynamic analysis has limitations when applied to programs based on the actor concurrent programming model. In the actor model, programs are composed of actors that communicate via asynchronous message passing. An actor, upon receiving a message, may perform local operations, create more actors, send messages, and/or change its local state. Though the code of each actor is executed sequentially, multiple actors may process messages concurrently. When conventional happens-before-based dynamic analysis is applied to the execution of actor-based programs, only the particular actor execution order observed during the analyzed execution is considered. The conventional approach does not address the potential for actor scheduling and thread allocation to be different in different executions, and therefore does not cover all possible execution orderings, which can result in some concurrency defects going undetected. Reliably detecting concurrency defects using the conventional approach would require performing the analysis on a different execution order for every possible actor schedule, which is not a scalable solution.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, for a concurrent application, an execution trace that includes operations, extracting actor pairs from the execution trace, assigning each of the operations to an actor pair, and generating vector clocks for the operations. Each vector clock includes a clock value for each of the actor pairs.

In general, in one aspect, one or more embodiments relate to a system including a memory, coupled to a processor, including a repository that includes a concurrent application, an execution trace including operations that include a first operation and a second operation, actor pairs, and vector clocks for the operations. Each vector clock includes a clock value for each actor pair. The vector clocks include a first vector clock for the first operation and a second vector clock for the second operation. The system further includes an execution trace manager executing on the processor and using the memory, configured to generate, for the concurrent application, the execution trace, extract the actor pairs from the execution trace, and assign each of the operations to an actor pair. The system further includes a vector clock generator executing on the processor and using the memory, configured to generate the vector clocks for the operations.

In general, in one aspect, one or more embodiments relate to a non-transitory computer readable medium including instructions that, when executed by a processor, perform: generating, for a concurrent application, an execution trace that includes operations, extracting actor pairs from the execution trace, assigning each of the operations to an actor pair, and generating vector clocks for the operations. Each vector clock includes a clock value for each of the actor pairs.

Other aspects of the invention will be apparent from the following description and the appended claims.

DETAILED DESCRIPTION

Figure 1A:
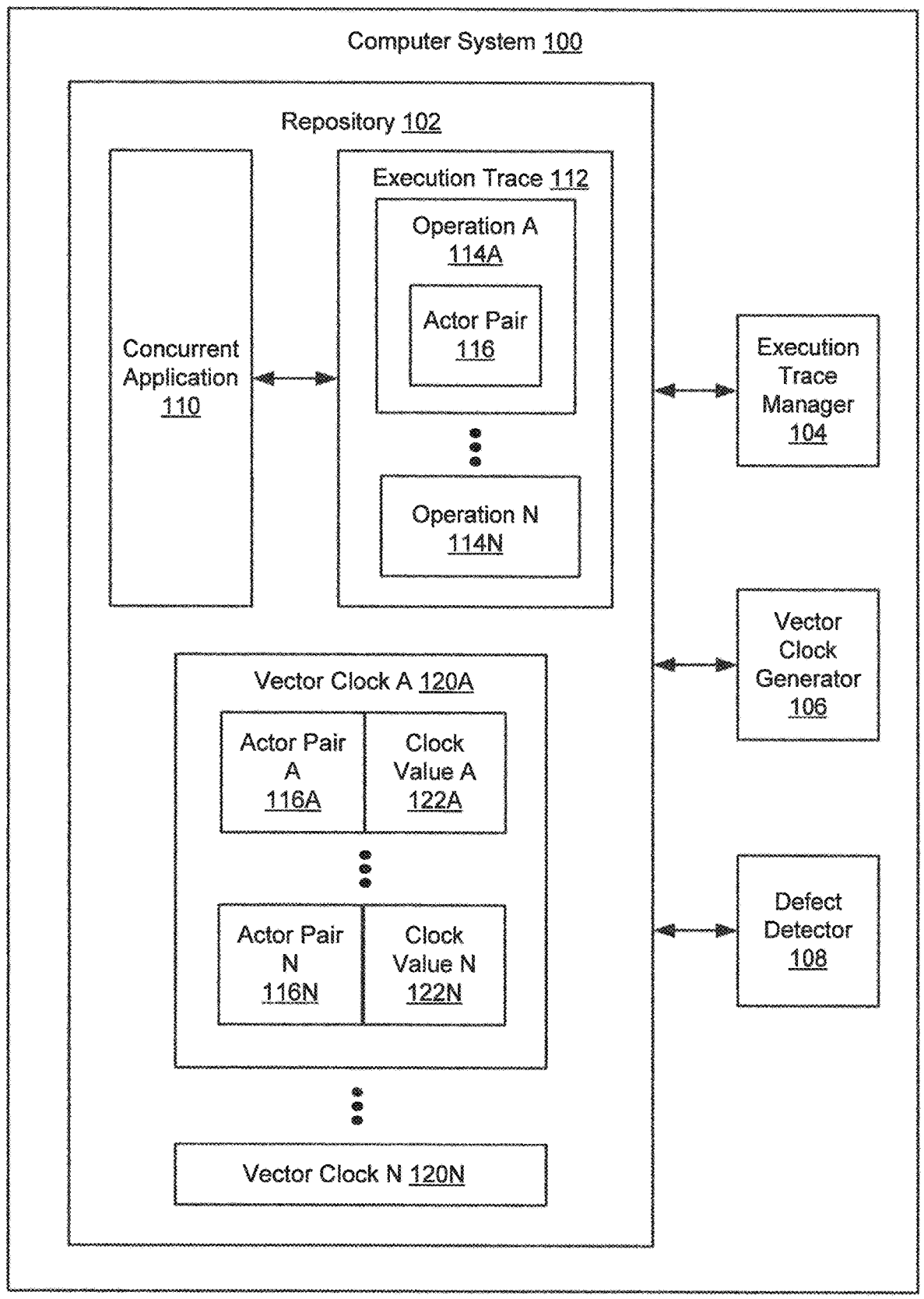
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method and system for generating vector clocks for a concurrent application. In one or more embodiments, vector clocks are generated for operations each assigned to a pair of actors whose activities are synchronized (e.g., where a receiver actor performs an operation in response to a message sent by a sender actor), where the actor pairs represent the fundamental units of parallel execution. The operations and actor pairs may be extracted from an execution trace generated for the concurrent application.

A vector clock may be thought of as a snapshot that measures the passage of time relative to each actor pair. In other words, the vector clock may represent a vector of clock values corresponding to the actor pairs. In one or more embodiments, each clock value of the vector clock indicates a "logical time" associated with the corresponding actor pair. For example, the clock value may indicate that a number of "ticks" has elapsed.

Generating vector clocks for operations assigned to actor pairs may permit the analysis of the concurrent application to capture, from a single execution trace, the possible reordering of operations executed by actors. In one or more embodiments, vector clocks provide a basis for determining when operations may be concurrent. Defects (e.g., data races) may be identified in the concurrent application when operations are concurrent, FIG. 1A shows a computer system (100) in accordance with one or more embodiments of the invention. As shown in FIG. 1A, the system (100) includes a repository (102), an execution trace manager (104), a vector clock generator (106), and a defect detector (108). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. For example, the repository (102) may be stored in non-persistent storage (504) or persistent storage (506), as described below with respect to FIG. 5A. Further, the repository (102) may include multiple different storage units and/or devices. The multiple different storage units and/or devices may or may not be of the same type or located at the same physical site.

In one or more embodiments, the repository (102) includes a concurrent application (110), an execution trace (112), and vector clocks (120A, 120N). In one or more embodiments, the concurrent application (110) is a collection of source code including various software components. That is, the concurrent application (110) may be a collection of computer instructions written in a human-readable programming language. The concurrent application (110) may be transformed by a compiler into binary machine code.

In one or more embodiments, the execution trace (112) includes operations (114A, 114N) performed during the execution of the concurrent application (110). The operations (114A, 114N) may be executed by one or more processors (e.g., computer processor(s) (502) of FIG. 5A). Examples of operations (114A, 114N) may include tasks, transactions, sending messages, receiving messages, etc. The operations (114A, 114N) may be ordered in a sequence. For example, each operation (114A, 114N) may be associated with a timestamp indicating when the operation (114A, 114N) was performed.

In one or more embodiments, each operation A (114A) is associated with (e.g., assigned to) an actor pair (116). In other words, the actor pair (116) may represent the fundamental unit of parallel execution. The actor pair (116) may include a pair of actors whose activities are synchronized. In one or more embodiments, the actors in the actor pair (116) may exchange messages. In one or more embodiments, an actor pair (116) is synchronized when one member (e.g., the sender) of the actor pair (116) sends a message that is received by the other member (e.g., the receiver) of the actor pair (116). The messages exchanged between the actors of the actor pair (116) may correspond to precedence and/or causal relationships between the operations (114A, 114N) performed by of the actors. For example, a "send message" operation precedes the corresponding "receive message" operation.

In one or more embodiments, the receiver of the actor pair (116) performs one or more operations (114A, 114N) in response to receiving the message from the sender of the actor pair (116). For example, the message may include a request that may be satisfied by performing the one or more operations (114A, 114N). In one or more embodiments, according to the actor programming model, the receiver does not receive any subsequent messages from the sender until the receiver has completed performing the operation(s) (114A, 114N) in response to receiving the previous message from the sender.

Figure 1B:
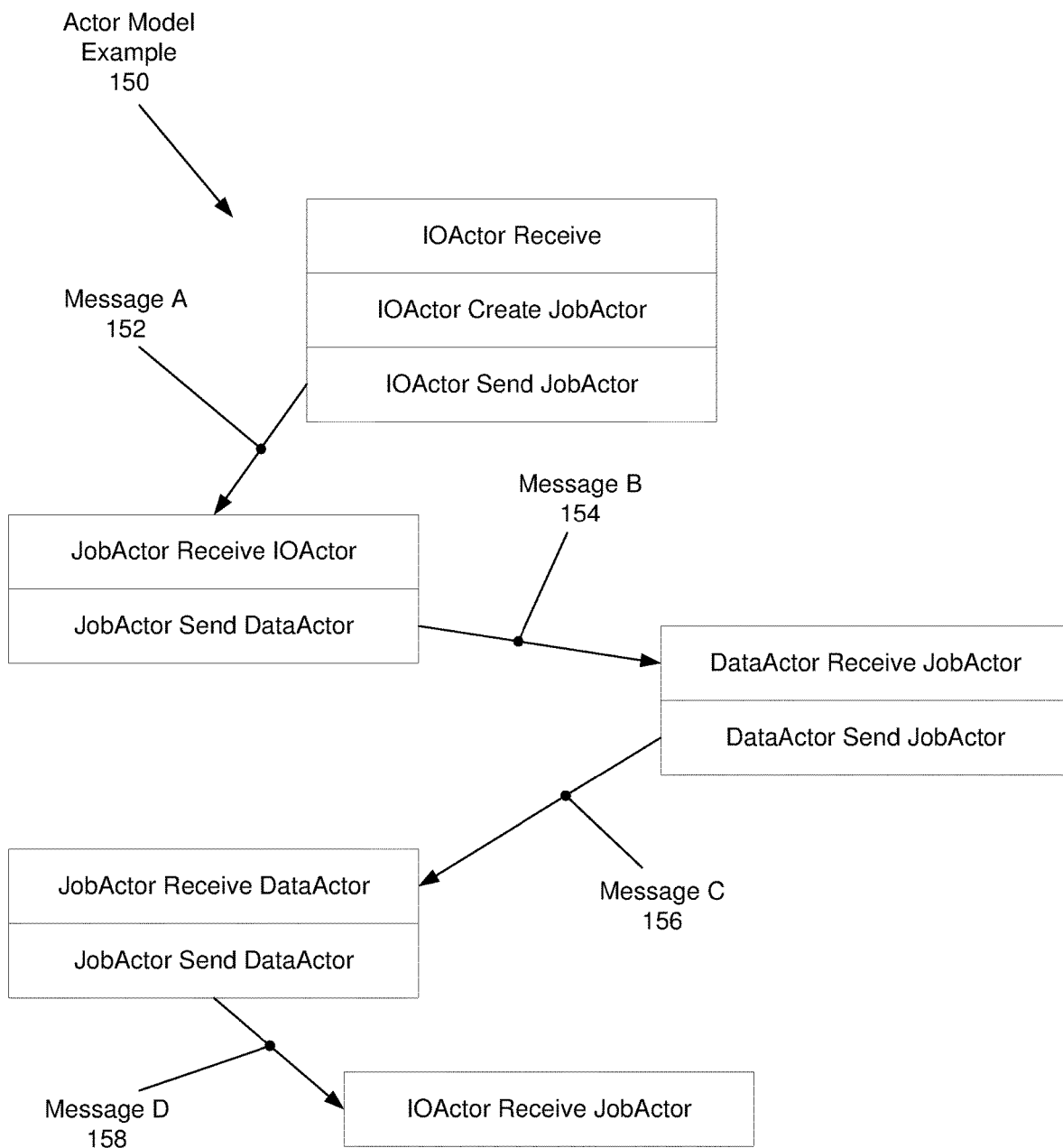

When an actor receives a message, it can perform operations (114A, 114N), create more actors, send messages and/or change its local state. In one or more embodiments, according to the actor programming model, the code that implements an individual actor may be executed sequentially, while messages may be processed by multiple actors concurrently. Label actor like FIG. 4 pair, FIG. 1B shows an actor model example (150) in which there are three types of actors: IOActor, DataActor and JobActor. In this example, one IOActor and one DataActor exist initially. When the IOActor receives a request (e.g., from an external input/output source) to perform an operation, it creates a new JobActor, and sends message A (152) to that JobActor describing the operation to be performed, and awaits the next request. When the JobActor receives message A (152), it begins performing the operation. If, when performing the operation, some data is needed, the JobActor sends message B (154) to the DataActor, requesting the data, and awaits the reply message C (156). When the DataActor receives message B (154), it retrieves the necessary data and sends the data in the reply message C (156) to the JobActor, which receives the reply message C (1.56) and continues performing the operation. When the operation is complete, the JobActor sends message D (158) to the IOActor notifying the IOActor of the completion of the operation, and then terminates. The IOActor receives the completion message D (158) and sends a response to the original request (e.g., via external input/output).

Returning to FIG. 1A, in one or more embodiments, each vector clock (120A, 120N) includes a clock value (122A, 122N) for each actor pair (116A, 116N). A vector clock (120A) may be thought of as a snapshot that measures the passage of time relative to each actor pair (116A, 116N) associated with the execution trace (112). In other words, the vector clock (120A) may represent a "vector" of clock values (122A, 122N) corresponding to the actor pairs (116A, 116N).

In one or more embodiments, each clock value (122N) of the vector clock (120N) may indicate a "logical time" associated with the corresponding actor pair (116N). For example, the clock value (122N) for an actor pair (116N) may indicate that a number of "ticks" has elapsed. For example, each "tick" may correspond to an operation (114N) performed by the receiver of the corresponding actor pair (116N).

Continuing with FIG. 1A, the execution trace manager (104) may be implemented in hardware (e.g., circuitry), software, or any combination thereof. In one or more embodiments, the execution trace manager (104) includes functionality to generate an execution trace (112) for the concurrent application (110). In one or more embodiments, the execution trace manager (104) includes functionality to extract actor pairs (116A, 116N) from the execution trace (112). The execution trace manager (104) may also include functionality to assign an actor pair (116) to each operation (114A, 114) included in the execution trace (112).

The vector clock generator (106) may be implemented in hardware (e.g., circuitry), software, or any combination thereof. In one or more embodiments, the vector clock generator (106) includes functionality to generate a vector clock (120A) for an operation (114A) associated with an actor pair (116A). In one or more embodiments, the vector clock generator (106) includes functionality to determine whether an operation (114A, 114N) happens before another operation (114A, 114N).

The defect detector (108) may be implemented in hardware (e.g., circuitry), software, or any combination thereof. In one or more embodiments, the defect detector (108) includes functionality to identify a potential defect in the concurrent application (110) (e.g., based on whether a happens-before relation exists between operations (114A, 14N)).

While FIG. 1A shows a configuration of components, other configurations may be used without departing from the scope of the invention. For example, various components may be combined to create a single component. As another example, the functionality performed by a single component may be performed by two or more components.

Figure 2:
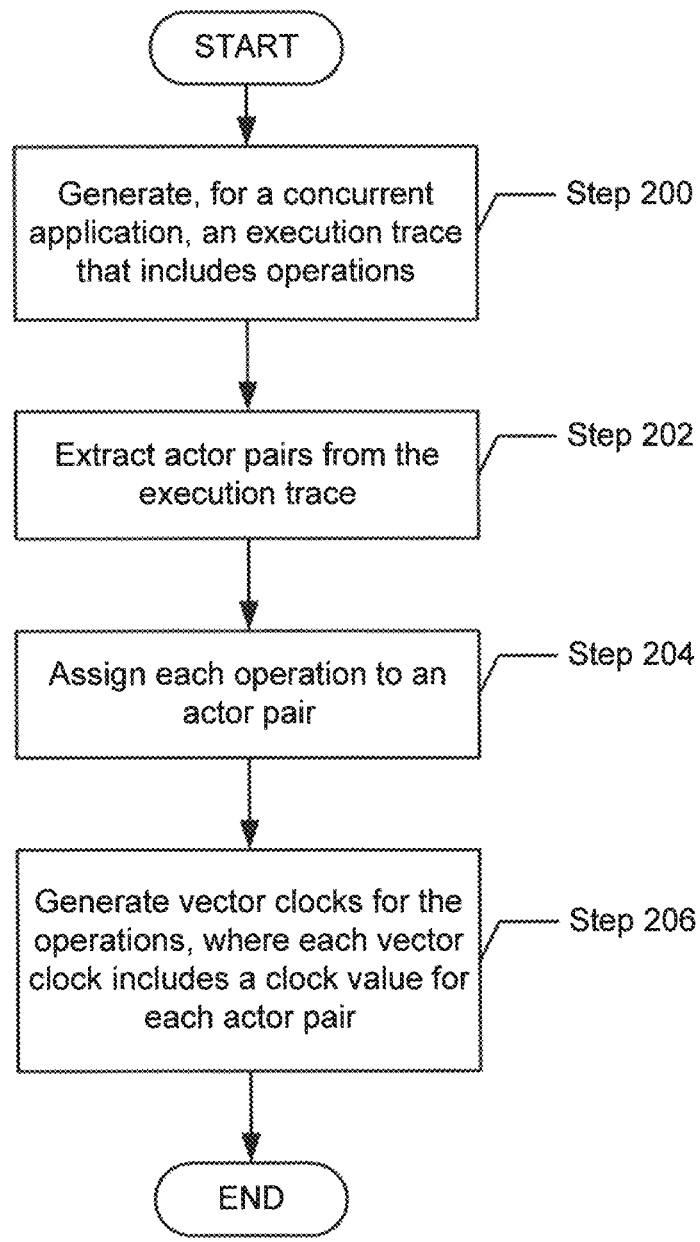
FIG. 2 and FIG. 3 show flowcharts in accordance with one or more embodiments of the invention.

FIG. 2 shows a flowchart in accordance with one or more embodiments of the invention. The flowchart depicts a process for analyzing a concurrent application. One or more of the steps in FIG. 2 may be performed by the components (e.g., the execution trace manager (104), vector clock generator (106), or the defect detector (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, an execution trace for a concurrent application is generated. In one or more embodiments, the execution trace includes operations performed during the execution of the concurrent application. Examples of operations may include tasks, transactions, sending messages, receiving messages, etc. The operations may be ordered in a sequence.

In one or more embodiments, the execution trace is generated by instrumenting the concurrent application (e.g., at the source code or binary level) to insert additional instructions at relevant statements in the concurrent application. Alternatively, the execution trace may generated by executing the concurrent application in a virtual machine (VM) that intercepts the relevant statements.

In one or more embodiments, a single execution trace is generated. For example, a single execution trace may be sufficient to support the identification of concurrent operations in the concurrent application (see discussion of Step 206 below).

In Step 202, actor pairs are extracted from the execution trace. Each actor pair may include a pair of actors whose activities are synchronized. The actor pairs may represent the fundamental units of parallel execution. In one or more embodiments, an actor pair is synchronized when the sender of the actor pair sends a message that is received by the receiver of the actor pair. The receiver may perform one or more operations in response to receiving the message from the sender. For example, the message may include a request that may be satisfied by performing the one or more operations.

In Step 204, each operation is assigned to an actor pair. In one or more embodiments, the receiver of the actor pair performed the operation in response to receiving a message from the sender of the actor pair. In one or more embodiments, the receiver may be determined, in part, by examining the execution trace to identify which actor received a message when the operation was executed (e.g., during a time interval encompassing the timestamp associated with the operation).

In Step 206, vector clocks are generated for operations. Each vector clock may include a clock value for each actor pair extracted in Step 202 above. Thus, the size of the vector clock (e.g., the number of clock values in the vector clock) may be determined by the number of actor pairs extracted in Step 202 above.

A vector clock may be thought of as a snapshot that measures the passage of time relative to each actor pair associated with the execution trace. In other words, the vector clock may represent a "vector" of clock values corresponding to the actor pairs associated with the execution trace. In one or more embodiments, each clock value of the vector clock may indicate a "logical time" associated with the corresponding actor pair. For example, the clock value for an actor pair may indicate that a number of "ticks" has elapsed. The vector clock may be thought of as representing the logical time for each actor pair from the perspective of the actor pair to which the corresponding operation was assigned in Step 204 above.

In one or more embodiments, vector clocks associated with operations in the execution trace may provide a basis for inferring a happens-before (i.e., precedence) relation between those operations. For example, if each clock value of the vector clock for operation A is less than or equal to the corresponding clock value of the vector clock for operation B, then it may be inferred that operation A happens before operation B. For example, operation A and operation B may be performed by the same thread, such that operation A was performed before operation B. Alternatively, operation A and operation B may be performed by different threads, but a synchronization constraint between operation A and operation B may require that operation A is performed before operation B (e.g., a signal or message sent by operation A is received by operation B). Still alternatively, operation A and operation B may be transitively related to an operation C, such that operation A happens-before operation C, and operation C happens-before operation B.

In one or more embodiments, determining the presence of a happens-before relation between operations is independent of how the actors performing the operations are assigned to threads and/or processes of the computer system and independent of how the threads and/or processes are scheduled by the computer system. In other words, the happens-before relation may be determined based on the vector clocks generated for the operations without considering how actors are assigned to threads and/or processes of the computer system.

In one or more embodiments, if no happens-before relation can be inferred between two operations, then it may be inferred that the two operations may be executed concurrently. In one or more embodiments, if one or more clock values of the vector clock for operation A are less than the corresponding clock values of the vector clock for operation B, and one or more clock values of the vector clock for operation. A are greater than the corresponding clock values of the vector clock for operation B, then it may be inferred that operation A and operation B may execute concurrently. That is, the execution of operation A may proceed independently of the execution of operation B, and vice versa.

A defect may be identified in the concurrent application when operations are concurrent. For example, the defect may be due to a potential data race when one of the concurrent operations writes to a memory location and another of the concurrent operations reads from the same memory location. That is, in the absence of a precedence constraint (e.g., a happens-before relation) that requires one operation to be performed before the other operation, in some executions the write may be performed after the read, while in other executions the write may be performed before the read, potentially resulting in inconsistent behavior in different executions of the concurrent application. As another example, the defect may involve multiple, concurrent remote procedure calls to the same process executing in the computer system.

Since actors typically communicate with only a small number of other actors, generating vector clocks for an execution trace that includes M operations for a concurrent application with N actors is likely to have a computational complexity of O(MN) in practice. By similar reasoning, computing happens-before relationships is likely to have a computational complexity of O(N) in practice since the size of the vector clock, which is proportional to the number of actor pairs, is likely to be N times a constant value (e.g., since each actor is likely to communicate with only a small number of other actors). Furthermore, only a single execution trace is required, in contrast to conventional techniques that must address the combinatorial number of ways to schedule the execution of the operations of the concurrent application.

Figure 3:
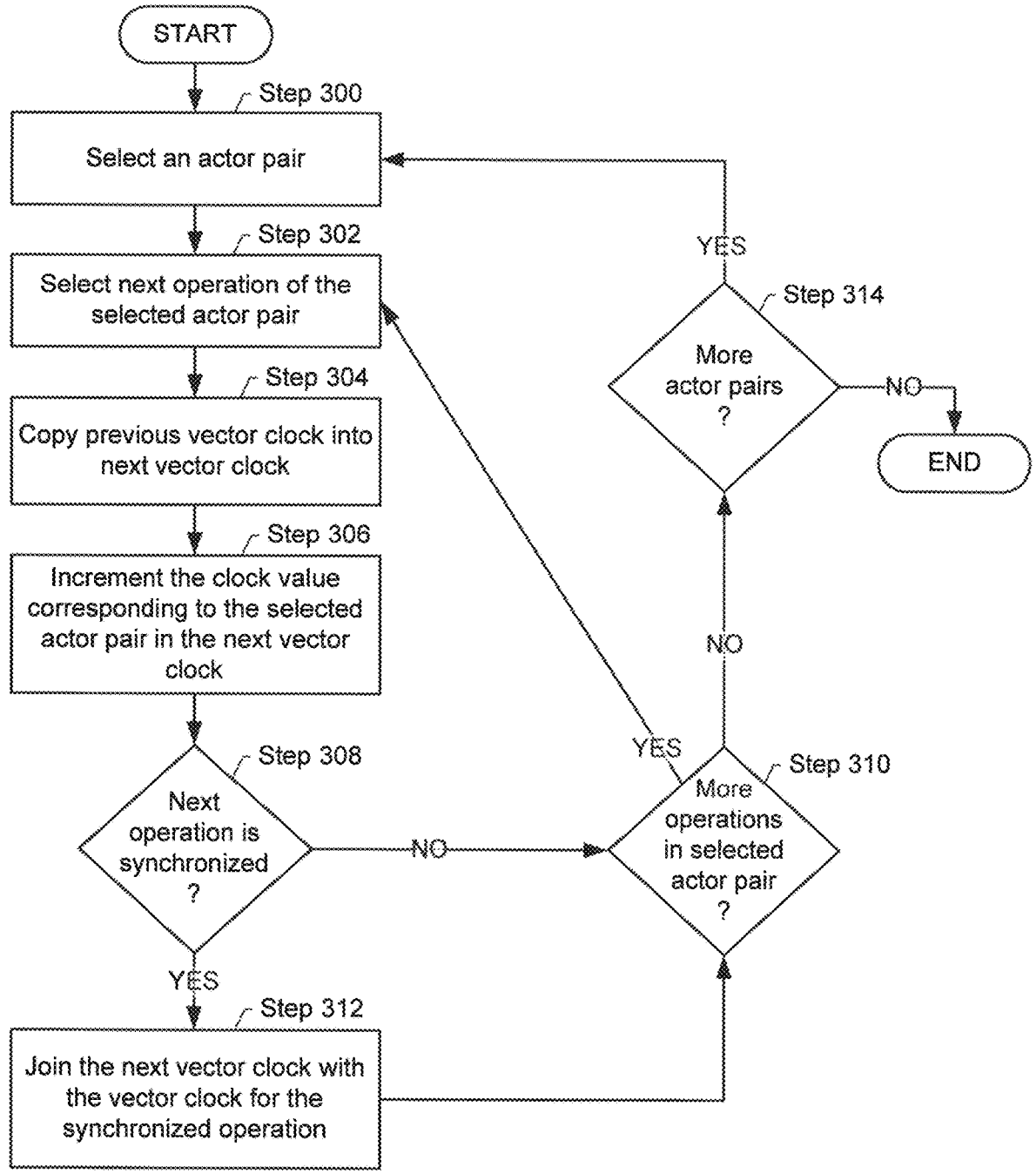

FIG. 3 shows a flowchart in accordance with one or more embodiments of the invention. The flowchart depicts a process for generating a vector clock. Moreover, the flowchart in FIG. 3 may correspond to Step 206 in FIG. 2. One or more of the steps in FIG. 3 may be performed by the components (e.g., the execution trace manager (104), vector clock generator (106), or the defect detector (108) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, an actor pair is selected. For example, the actor pair may be an actor pair extracted from the execution trace in Step 202 above. In one or more embodiments, each actor pair is selected in successive executions of Step 300 (e.g., in successive iterations of the process executed by FIG. 3).

In Step 302, the next operation assigned to the actor pair is selected. In one or more embodiments, each operation assigned to the actor pair is selected in successive executions of Step 302. For example, the next operation may be the operation assigned to the actor pair with the earliest timestamp that has not yet been selected in an iteration of Step 302. That is, the next operation may be the operation assigned to the actor pair with the earliest timestamp, such that a vector clock has not yet been generated for the operation.

In Step 304, a previous vector clock for a previous operation assigned to the actor pair is copied to a next vector clock for the next operation. That is, the next vector clock may be based on modifying (e.g., as described in Step 306 below) the previous vector clock for the previous operation assigned to the actor pair. In one or more embodiments, the previous operation may be the operation assigned to the actor pair with the latest timestamp that is less than the timestamp of the next operation. In one or more embodiments, when there is no previous operation assigned to the actor pair (i.e., the selected operation is the first operation executed by the actor pair), then the previous vector clock is a vector clock whose clock values are all set to zero.

In Step 306, the clock value corresponding to the selected actor pair in the next vector clock is incremented. That is, since the receiver of the selected actor pair has performed the next operation, the clock value corresponding to the selected actor pair may now be incremented (e.g., "ticked") to reflect the execution of the next operation. In one or more embodiments, if the next operation is a "send message" operation, then a previously suspended Step 312 below (e.g., in a previously begun iteration of the process performed in FIG. 3 for some other actor pair) may be resumed now that the next vector clock has been generated. For example, "send message" operation may correspond to a "receive message" operation whose processing was suspended in a previous execution of Step 312.

If, in Step 308, it is determined that the next operation is synchronized with another operation assigned to another actor pair, then Step 312 below is performed. In one or more embodiments, the next operation is synchronized with another operation assigned to another actor pair (e.g., where the other operation is performed by the receiver of the other actor pair): when the next operation waits for the result of the other operation. For example, the next operation is synchronized with another operation when the next operation is a "receive message" operation that corresponds to a "send message" operation assigned to another actor pair.

Otherwise, if it is determined that the next operation is not synchronized with another operation, then Step 310 below is performed.

If, in Step 310, it is determined that there are additional operations to be performed by the selected actor pair, then Step 302 above is again performed for another operation of the selected actor pair. Otherwise, if it is determined that there are no additional operations to be performed by the selected actor pair, then Step 314 below is performed.

In Step 312, the next vector clock is joined with the vector clock of the synchronized operation assigned to the other actor pair (see description of Step 308 above). In one or more embodiments, joining two vector clocks produces a new vector clock whose clock values are the maximum of the corresponding clock values of the vector clocks being joined. For example, joining the vector clock [2 5 0] and the vector clock [3 2 1] produces the vector clock [3 5 1].

In one or more embodiments, if the vector clock of the synchronized operation assigned to the other actor pair has not yet been generated, then Step 312 may be suspended until the vector clock for the synchronized operation (e.g., a "send message" operation corresponding to a "receive message" operation assigned to the selected actor pair) is generated. Once the vector clock for the synchronized operation is generated, then the suspended Step 312 may be resumed, and the next vector clock may be joined with the vector clock of the synchronized operation (see description of Step 306 above). Execution then continues with Step 310 above.

If, in Step 314, it is determined that there are additional actor pairs that have not been selected, then Step 300 above is again performed for another actor pair. The process performed in FIG. 3 may be repeated until all actor pairs have been selected, and a vector clock has been generated for each operation assigned to each actor pair.

Figure 4:
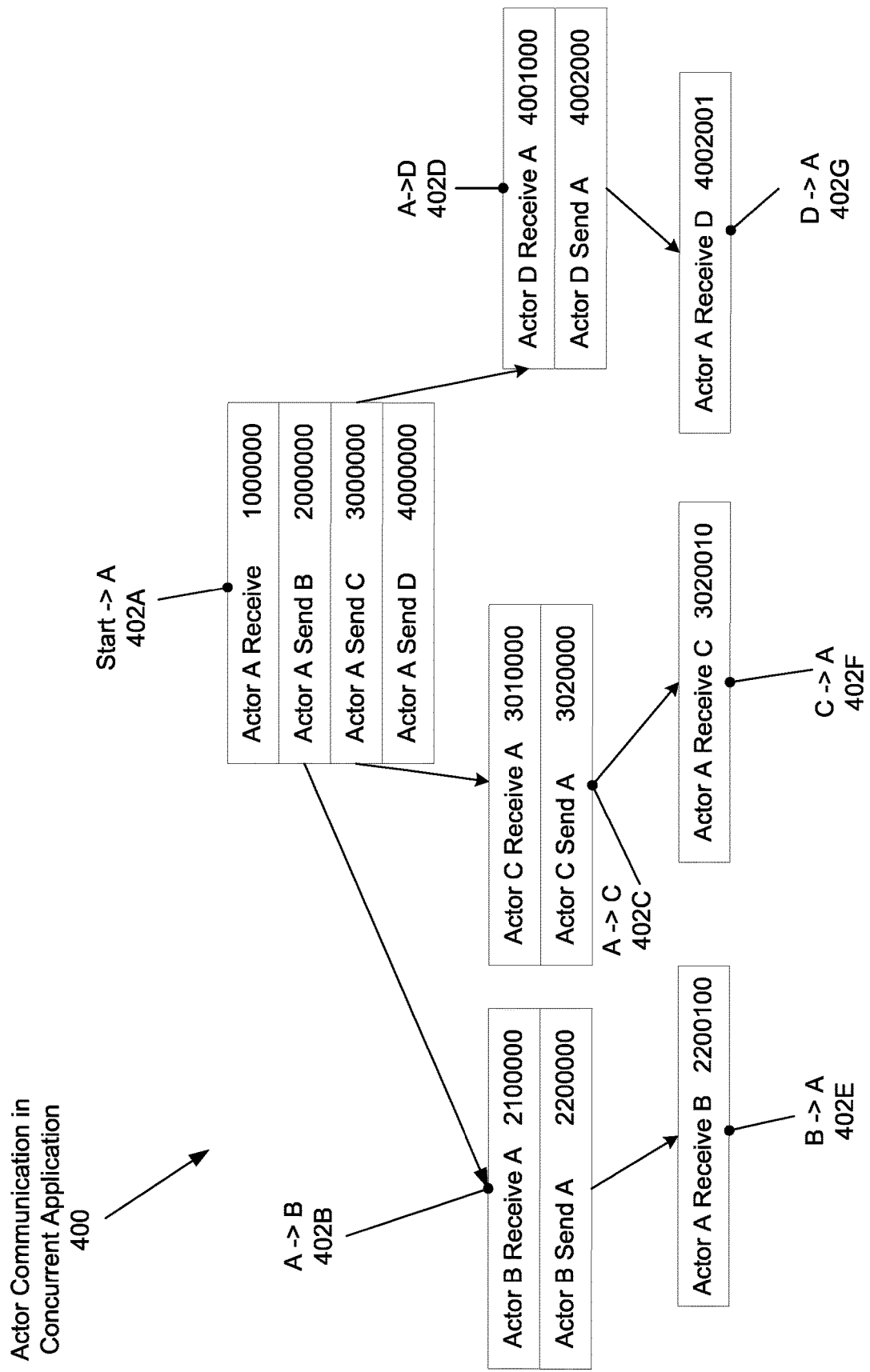
FIG. 4 shows an example in accordance with one or more embodiments of the invention.

The following example is for explanatory purposes only and not intended to limit the scope of the invention. FIG. 4 shows an implementation example in accordance with one or more embodiments of the invention. FIG. 4 illustrates the generation of vector clocks for operations assigned to different actor pairs (402A, 402B, 402C, 402D, 402E, 402F, 402G). In this nonlimiting example, the generation of vector clocks occurs during the analysis of an execution trace ((112) in FIG. 1A) generated for a concurrent application ((110) in FIG. 1A) by the execution trace manager ((104) in FIG. 1A).

FIG. 4 is based on an actor model in which messages sent from a particular sender to a particular receiver are guaranteed to be delivered in the order that they were sent. However, there are no ordering guarantees with respect to messages sent between different sender-receiver actor pairs (including messages sent from the same sender to a different receiver, and those sent from a different sender to the same receiver). In FIG. 4, the concurrent application includes four actors (A, B, C, D) who communicate via send and receive operations as follows:

1) Actor A sends a message to each of actors B, C, and D, as illustrated by the 3 send operations assigned to actor pair "start→A" (402A), shown in FIG. 4.

2) Actors B, C, and D each concurrently process the received message and then send another message back to actor A. This is illustrated by the receive and send operations assigned to each of actor pair "A→B" (402B), actor pair "A→C" (402C), and actor pair "A→D" (402D). The notation "A→B" means that in actor pair "A→B" (402B), actor A (i.e., the sender) sends a message that is received by actor B (i.e., the receiver).

3) Actor A processes each reply message as the message is received, as illustrated by the receive operation assigned to each of actor pair "B→A" (402E), actor pair "C→A" (402F), and actor pair "D→A" (402G).

Each vector clock generated by the vector clock generator ((106) in FIG. 1A) contains 7 clock values, one corresponding to the logical time for each of the 7 actor pairs (402A, 402B, 402C, 402D, 402E, 402F, 402G). At the start of execution, the clock values of the initial vector clock for each of the actor pairs are set to zero (e.g., [0, 0, 0, 0, 0, 0, 0]).

Initially, the vector clock generator generates vector clock [1, 0, 0, 0, 0, 0, 0] for the operation "actor A receive" assigned to actor pair "start→A" (402A) by incrementing the clock value corresponding to actor pair "start→A" (402A) (i.e., the first clock value in the vector clock) relative to the initial vector clock [0, 0, 0, 0, 0, 0, 0]. The operation "actor A receive" is an initial bootstrapping operation assigned to actor A that represents the start of the concurrent application. For example, actor A may receive an initial message from an entity external to the concurrent application.

Next, the vector clock generator generates vector clock [2, 0, 0, 0, 0, 0, 0] for the operation "actor A send B" assigned to actor pair "start→A" (402A) by incrementing the clock value corresponding to actor pair "start→A" (402A) relative to the previously generated vector clock [1, 0, 0, 0, 0, 0, 0] for the operation. "actor A receive".

In a similar fashion, the vector clock generator generates vector clock [3, 0, 0, 0, 0, 0, 0] for the operation "actor A send C" assigned to actor pair "start→A" (402A) by incrementing the clock value corresponding to actor pair "start→A" (402A) relative to the previously generated vector clock [2, 0, 0, 0, 0, 0, 0] for the operation "actor A send B".

Likewise, in a similar fashion, the vector clock generator generates vector clock [4, 0, 0, 0, 0, 0, 0] for the operation "actor A send D" assigned to actor pair "start→A" (402A) by incrementing the clock value corresponding to actor pair "start→A" (402A) relative to the previously generated vector clock [3, 0, 0, 0, 0, 0, 0] for the operation "actor A send C".

Next, the vector clock generator generates vector clock [2, 1, 0, 0, 0, 0, 0] for the operation "actor B receive A" assigned to actor pair "A→B" (402B) in two steps (below) because the operation "actor B receive A" is synchronized with the operation "actor A send B" (described above) assigned to actor pair "start→A" (402A):

1) generating vector clock [0, 1, 0, 0, 0, 0, 0] by incrementing the clock value corresponding to actor pair "A→B" (402B) (i.e., the second clock value in the vector clock) relative to the initial vector clock [0, 0, 0, 0, 0, 0, 0].

2) joining the vector clock generating in 1) above with the vector clock [2, 0, 0, 0, 0, 0, 0] generated above for the operation "actor A send B" assigned to actor pair "start→A" (402A).

Next, the vector clock generator generates vector clock [2, 2, 0, 0, 0, 0, 0] for the operation "actor B send A" assigned to actor pair "A→B" (402B) by incrementing the clock value corresponding to actor pair "A→B" (402B) relative to the previously generated vector clock [2, 1, 0, 0, 0, 0, 0] for the operation "actor B receive A".

Next, the vector clock generator generates vector clock [2, 2, 0, 0, 1, 0, 0] for the operation "actor A receive B" assigned to actor pair "B→A" (402E) in two steps (below) because the operation "actor A receive B" is synchronized with the operation "actor B send A" (described above) assigned to actor pair "A→B" (402B):

1) generating vector clock [0, 0, 0, 0, 1, 0, 0] by incrementing the clock value corresponding to actor pair "B→A" (402E) (i.e., the fifth clock value in the vector clock) relative to the initial vector clock [0, 0, 0, 0, 0, 0, 0].

2) joining the vector clock generating in 1) above with the vector clock [2, 2, 0, 0, 0, 0, 0] generated above for the operation "actor B send A" assigned to actor pair "A→B" (402B).

Next, the vector clock generator generates vector clock [3, 0, 1, 0, 0, 0, 0] for the operation "actor C receive A" assigned to actor pair "A→C" (402C) in two steps (below) because the operation "actor C receive A" is synchronized with the operation "actor A send C" (described above) assigned to actor pair "start→A" (402A):

1) generating vector clock [0, 0, 1, 0, 0, 0, 0] by incrementing the clock value corresponding to actor pair "A→C" (402B) (i.e., the third clock value in the vector clock) relative to the initial vector clock [0, 0, 0, 0, 0, 0, 0].

2) joining the vector clock generating in 1) above with the vector clock [3, 0, 0, 0, 0, 0, 0] generated above for the operation "actor A send C" assigned to actor pair "start→A" (402A).

The vector clock generator continues generating vector clocks in this manner until vector clocks have been generated for each operation in the execution trace (112). The defect detector ((108) in FIG. 1A) then uses the vector clocks generated above to determine whether various operations are concurrent (e.g., to detect potential data races).

Figure 5A:
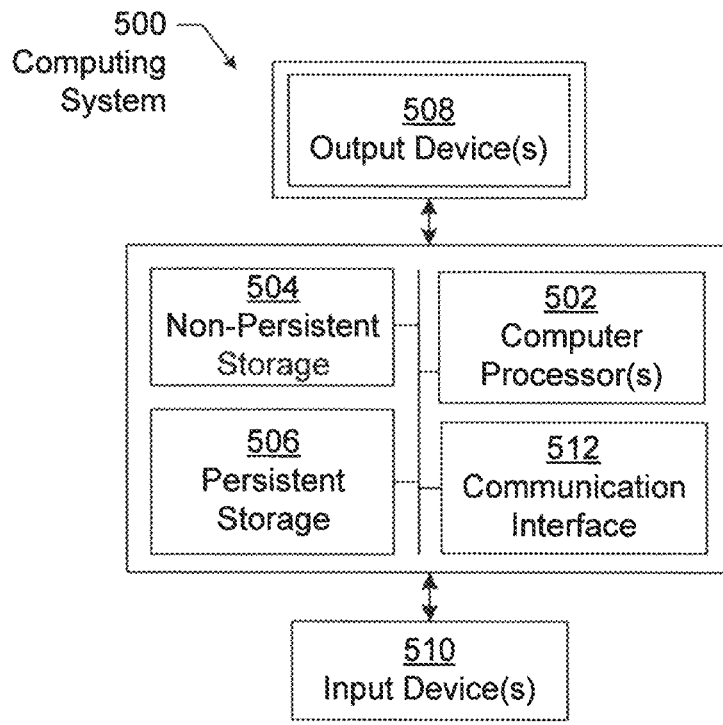
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
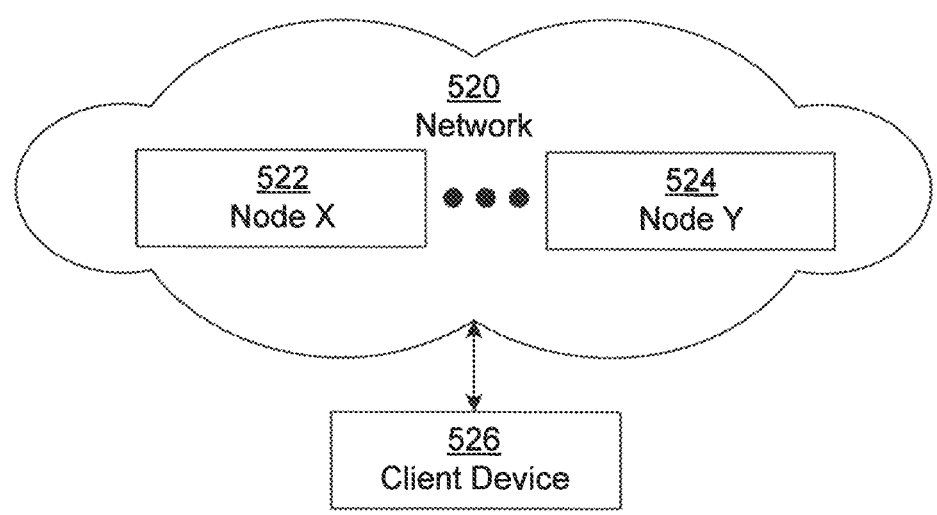

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or nonpersistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   generating, for a concurrent application, an execution trace comprising a plurality of operations comprising a first operation and a second operation;
   extracting, from the execution trace, a plurality of actor pairs comprising a first actor pair and a second actor pair, wherein each of the plurality of actor pairs comprises a sender and a receiver, wherein the sender sends a message to the receiver, and wherein the receiver performs an operation of the plurality of operations in response to receiving the message;
   assigning the first operation to the first actor pair and the second operation to the second actor pair;
   generating a plurality of vector clocks for the plurality of operations, each vector clock comprising a clock value for each of the plurality of actor pairs; and
   determining that the first operation is synchronized with the second operation by determining that the receiver of the second actor pair sends a message that is received by the receiver of the first actor pair.

2. The method of claim 1, wherein the plurality of vector clocks comprises a first vector clock for the first operation and a second vector clock for the second operation, the method further comprising:
   determining whether the first operation and the second operation are concurrent by comparing the first vector clock and the second vector clock; and
   in response to determining that the first operation and the second operation are concurrent, identifying a potential defect in the concurrent application.

3. The method of claim 2, wherein comparing the first vector clock and the second vector clock comprises:
   comparing the clock value for one or more of the plurality of actor pairs of the first vector clock with the clock value for the corresponding actor pair of the second vector clock.

4. The method of claim 2, further comprising:
   in response to determining that the first operation is synchronized with the second operation, joining the first vector clock with the second vector clock.

5. The method of claim 2,
   wherein the execution trace indicates, for each of the plurality of operations, a thread of a computer system that executed the operation, and
   wherein determining that the first operation and the second operation are concurrent is independent of the thread that executed the first operation and the thread that executed the second operation.

6. The method of claim 2,
   wherein the plurality of vector clocks further comprises a previous vector clock for a previous operation of the plurality of operations,
   wherein the previous operation is assigned to the first actor pair,
   wherein the previous operation is executed before the first operation in the execution trace, and
   wherein generating the first vector clock comprises:
   copying each clock value of the previous vector clock into the first vector clock; and
   incrementing, in the first vector clock, the clock value corresponding to the first actor pair.

7. The method of claim 1, wherein the receiver of the second actor pair is the same as the sender of the first actor pair.

8. A system, comprising:
   a memory, coupled to a processor, comprising a repository comprising:
   a concurrent application,
   an execution trace comprising a plurality of operations comprising a first operation and a second operation,
   a plurality of actor pairs comprising a first actor pair and a second actor pair, wherein each of the plurality of actor pairs comprises a sender and a receiver, wherein the sender sends a message to the receiver, and wherein the receiver performs an operation of the plurality of operations in response to receiving the message, and
   a plurality of vector clocks for the plurality of operations, each of the plurality of vector clocks comprising a clock value for each of the plurality of actor pairs, the plurality of vector clocks comprising a first vector clock for the first operation and a second vector clock for the second operation;
   an execution trace manager executing on the processor and using the memory, configured to:

generate, for the concurrent application, the execution trace;
extract the plurality of actor pairs from the execution trace;
assign the first operation to the first actor pair and the second operation to the second actor pair; and
determine that the first operation is synchronized with the second operation by determining that the receiver of the second actor pair sends a message that is received by the receiver of the first actor pair; and
a vector clock generator executing on the processor and using the memory, configured to generate the plurality of vector clocks for the plurality of operations.

9. The system of claim 8, further comprising:
a defect detector configured to:
  determine whether the first operation and the second operation are concurrent by comparing the first vector clock and the second vector clock; and
  in response to determining that the first operation and the second operation are concurrent, identify a potential defect in the concurrent application.

10. The system of claim 9, wherein the defect detector is configured to compare the first vector clock and the second vector clock by comparing the clock value for one or more of the plurality of actor pairs of the first vector clock with the clock value for the corresponding actor pair of the second vector clock.

11. The system of claim 9,
wherein the execution trace indicates, for each of the plurality of operations, a thread of a computer system that executed the operation, and
wherein determining that the first operation and the second operation are concurrent is independent of the thread that executed the first operation and the thread that executed the second operation.

12. The system of claim 8, wherein the vector clock generator is further configured to:
in response to determining that the first operation is synchronized with the second operation, join the first vector clock with the second vector clock.

13. The system of claim 8,
wherein the receiver of the second actor pair is the same as the sender of the first actor pair.

14. The system of claim 8,
wherein the plurality of vector clocks further comprises a previous vector clock for a previous operation of the plurality of operations,
wherein the previous operation is assigned to the first actor pair,
wherein the previous operation is executed before the first operation in the execution trace, and
wherein the vector clock generator is further configured to generate the first vector clock by:
  copying each clock value of the previous vector clock into the first vector clock; and
  incrementing, in the first vector clock, the clock value corresponding to the first actor pair.

15. A non-transitory computer readable medium comprising instructions that, when executed by a processor, perform:
generating, for a concurrent application, an execution trace comprising a plurality of operations comprising a first operation and a second operation;
extracting, from the execution trace, a plurality of actor pairs comprising a first actor pair and a second actor pair, wherein each of the plurality of actor pairs comprises a sender and a receiver, wherein the sender sends a message to the receiver, and wherein the receiver performs an operation of the plurality of operations in response to receiving the message;
assigning the first operation to the first actor pair and the second operation to the second actor pair;
generating a plurality of vector clocks for the plurality of operations, each vector clock comprising a clock value for each of the plurality of actor pairs; and
determining that the first operation is synchronized with the second operation by determining that the receiver of the second actor pair sends a message that is received by the receiver of the first actor pair.

16. The non-transitory computer readable medium of claim 15, wherein the plurality of vector clocks comprises a first vector clock for the first operation and a second vector clock for the second operation, further comprising instructions that perform:
determining whether the first operation and the second operation are concurrent by comparing the first vector clock and the second vector clock; and
in response to determining that the first operation and the second operation are concurrent, identifying a potential defect in the concurrent application.

17. The non-transitory computer readable medium of claim 16, further comprising instructions that perform in response to determining that the first operation is synchronized with the second operation, joining the first vector clock with the second vector clock.

18. The non-transitory computer readable medium of claim 16,
wherein the execution trace indicates, for each of the plurality of operations, a thread of a computer system that executed the operation, and
wherein determining that the first operation and the second operation are concurrent is independent of the thread that executed the first operation and the thread that executed the second operation.

19. The non-transitory computer readable medium of claim 15,
wherein the receiver of the second actor pair is the same as the sender of the first actor pair.

\* \* \* \* \*

UNITED STATES PATENT AND TRADEMARK OFFICE
CERTIFICATE OF CORRECTION

PATENT NO. : 10,719,425 B2
APPLICATION NO. : 16/007983
DATED : July 21, 2020
INVENTOR(S) : Allen et al.

Page 1 of 1

It is certified that error appears in the above-identified patent and that said Letters Patent is hereby corrected as shown below:

In the Specification

Column 2, Line 20, delete "invention," and insert -- invention. --, therefor.

Column 3, Line 10, delete "concurrent," and insert -- concurrent. --, therefor.

Column 4, Line 16, after "concurrently." delete "Label actor like FIG. 4 pair,".

Column 4, Line 31, delete "(1.56)" and insert -- (156) --, therefor.

Column 5, Lines 13-14, delete "(114A, 14N))." and insert -- (114A, 114N)). --, therefor.

Column 6, Line 4, delete "timestarnp" and insert -- timestamp --, therefor.

Column 6, Line 60, delete "operation." and insert -- operation --, therefor.

Column 8, Line 6, delete "per: formed" and insert -- performed --, therefor.

Column 8, Line 24, delete "pair):" and insert -- pair) --, therefor.

Column 9, Line 3, delete "nonlimiting" and insert -- non-limiting --, therefor.

Column 9, Line 56, delete "operation." and insert -- operation --, therefor.

Column 13, Line 34, delete "nonpersistent" and insert -- non-persistent --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*